United States Patent [19]
// Lazar et al.

[11] Patent Number: 5,953,316
[45] Date of Patent: Sep. 14, 1999

[54] RESERVATION METHOD AND SYSTEM FOR ASYNCHRONOUS TRANSFER MODE COMMUNICATIONS

[75] Inventors: Aurel A. Lazar; Mun Choon Chan, both of New York, N.Y.

[73] Assignee: The Trustees of Columbia University In the City of New York

[21] Appl. No.: 08/843,847

[22] Filed: Apr. 17, 1997

[51] Int. Cl.$^6$ .................................................. H04B 7/26
[52] U.S. Cl. ......................... 370/230; 707/103; 395/683
[58] Field of Search .................... 370/230, 232, 370/235, 236, 252, 397, 399, 683; 707/103; 395/683

[56] References Cited

U.S. PATENT DOCUMENTS

| | | |
|---|---|---|
| 5,416,771 | 5/1995 | Iwata ........................................ 370/397 |
| 5,434,852 | 7/1995 | La Porta et al. ......................... 370/58.2 |
| 5,548,581 | 8/1996 | Makrucki ................................. 370/232 |
| 5,568,475 | 10/1996 | Doshi et al. ............................ 370/58.2 |
| 5,583,860 | 12/1996 | Iwakawa et al. ........................ 370/232 |
| 5,600,640 | 2/1997 | Blair et al. .............................. 370/399 |

*Primary Examiner*—Chi H. Pham
*Assistant Examiner*—Maikhanh Tran
*Attorney, Agent, or Firm*—Baker & Botts, L.L.P.

[57] ABSTRACT

For enhanced efficiency in setting up routes, and for enhanced throughput in an ATM network, invocation of objects can be parallelized. Also, throughput of a connection manager can be increased, and the latency of call set-up decreased by caching of network states such as recently used routes, output or input VCI/VPIs, bandwidth and buffer resources and existing connection states. And systems throughput can be increased by aggregating multiple request messages into a single invocation instead of making multiple invocations.

17 Claims, 3 Drawing Sheets

CL-CLIENT PROGRAM        CM-CONNECTION MANAGER        NS-NODE SERVER

QM-QOS MAPPER            RO-ROUTE OBJECT

CL-CLIENT PROGRAM  CM-CONNECTION MANAGER  NS-NODE SERVER
QM-QOS MAPPER  RO-ROUTE OBJECT

CACHING SWITCHING NAME SPACES
- PERFORM STEP (1) IN ADVANCE AND CACHE THE OUT VCIs.
- USING THESE VCIs ALLOWS THE CONNECTION SETUP PHASE TO REDUCE TO A SINGLE PHASE.

RESERVATION METHOD AND SYSTEM FOR ASYNCHRONOUS TRANSFER MODE COMMUNICATIONS

TECHNICAL FIELD

This invention relates generally to broadband integrated services digital communications networks (B-ISDN) operating in asynchronous transfer mode (ATM) and, more specifically, to connection management in such networks.

BACKGROUND OF THE INVENTION

Connectivity, i.e. the establishment of a connection or communication path between two end points in a communications network is a fundamental task in network management. A corresponding capability is provided by a connection management system. In traditional telephone service networks, connection management involves defining a user/network interface (UNI) and a network/network interface (NNI). Current standards for connectivity services on B-ISDN networks basically amount to extensions of the UNI and NNI standards.

In the 1960s, at the time when the UNI and NNI standards were introduced, it was rightly recognized that customer premises equipment (CPE) had a low level of "intelligence" in comparison with the switching equipment, and that the user was interested mainly in manipulating the service at its end points. Today these assumptions are no longer valid, as the CPE often is at least as intelligent as the switch controllers.

The ability of the connection management system to create and deploy network services rapidly will be a key factor for future service providers to succeed. As the high-speed switching and communications infrastructure is improved, and as bandwidth becomes a commodity, product differentiation increasingly may depend on the level of sophistication, degree of flexibility and speed of deployment of network services.

Recent proposals for providing connectivity service are presented in TINA-C, Service Architecture Version 2.0, Document No. TB_MDC.012_2.0_94, March 1995 and by A. A. Lazar et al., "Realizing a Foundation for Programmability of ATM Networks with the Binding Architecture", IEEE Journal of Selected Areas in Communications, Special Issue on Distributed Multimedia Systems, Vol. 14, No. 7, September 1996, pp. 1214–1247. According to these proposals, controllers run on general-purpose distributed computing platforms and interact through local or remote invocations. This permits signaling activities to be formulated in high-level terms of operation instead of low-level mechanisms.

SUMMARY OF THE INVENTION

We have recognized that, for efficient connection processing, invocation of objects can be parallelized. We have also recognized that throughput of a connection manager can be increased, and the latency of call set-up decreased by caching of network states. And we have recognized further that systems throughput can be increased by aggregating multiple request messages into a single invocation instead of making multiple invocations.

DETAILED DESCRIPTION

Figure 1:
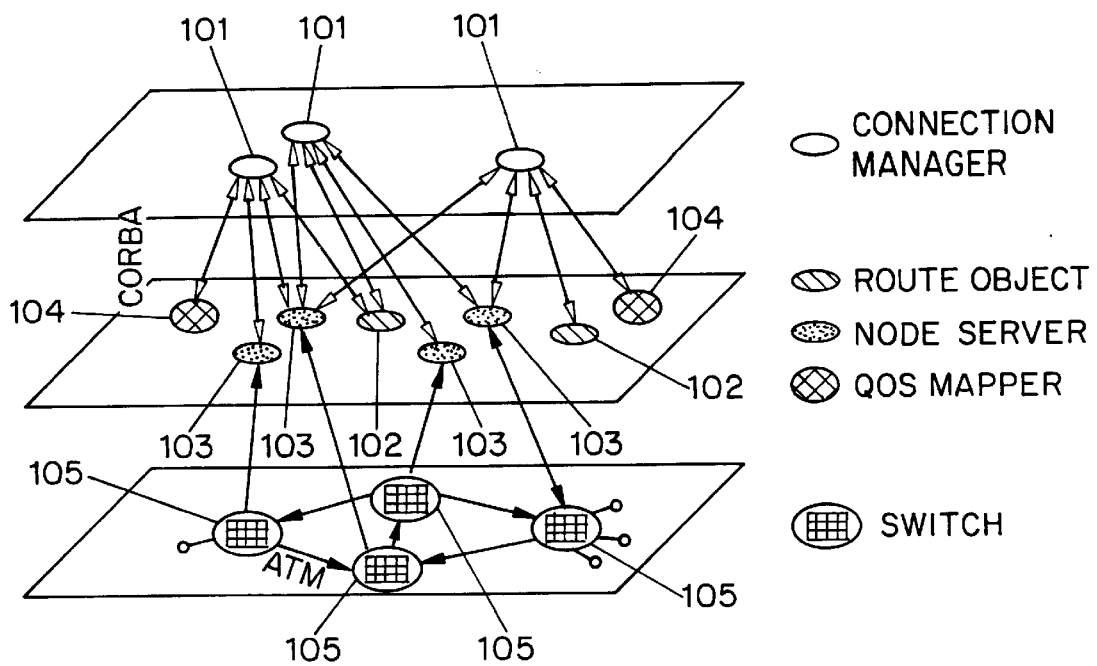
FIG. 1 is a schematic of a representative communications system including aspects of the invention, and of object interaction in the system.

ATM-based broadband networks include computerized switches connected by communications links which may take the form of wire, coaxial cable or optical fiber connections, for example. They employ cell transport techniques. Cells include a "payload" and a header with routing information. The header includes two key information fields of interest here, namely a virtual channel identifier (VCI) and a virtual path identifier (VPI). These are associated with each input and output port of every switch.

The input port VCI/VPIs are mapped into output port VCI/VPIs so as to permit every cell arriving at an input port to be switched onto the proper output port. This involves reference to switching tables which are set up by computerized switch controllers in accordance with instructions from a computerized connection manager.

Setting up the switching tables throughout the network leads to a substantial computational load on the switch controllers. Thus, the performance of the connection manager is of key importance for high call throughput and low call set-up delay in ATM network communications.

For specificity, without limiting the invention, the following description is of a preferred embodiment in which all communicating entities are CORBA objects operating in a distributed environment. The CORBA standard architecture is as documented by Object Management Group (OMG), The Common Request Broker: Architecture and Specification, Rev. 1.2, December 1993. In this environment, the most expensive operation is a remote object invocation. Again for specificity, such invocations are defined using the standard Interface Definition Language (IDL). The use of other signaling platforms, architectures, protocols and languages is not precluded.

Providing connection services is a basic task performed by a connection manager. In ATM-based networks, the following connection services are required:

(a) Mapping of user-level quality of service (QOS) to network QOS. QOS abstractions for network resources can be defined for each traffic class using specific cell loss and cell delay requirements. Service abstractions for customer premises equipment such as PCs and work stations are specified in terms of frame rate and frame loss, for example. In the present system, a QOSMapper translates the QOS specifications for frames to QOS specifications for ATM cells and vice versa.

(b) Route Selection. The path connecting two endpoints in the network is provided from a database here designated as RouteObject. Routes are updated by independently operating router objects.

(c) Resource Reservation. These connection manager tasks can be divided into two groups: reserving system resources such as buffer, bandwidth, CPU cycles and the like, and reserving and setting of identifiers in the switch fabric for cell transport. Each switch has a server for changing the contents of the switching table. Instructions for making such changes are issued by the connection manager of the communications system, for call/connection control. The reservation of system resources should be based on abstractions that are independent of the details of the system hardware, and should provide QOS guarantees. For manipulating the switch identifiers, a set of primitives is used as described in further detail by M. C. Chan et al., "Service Creation, Renegotiation and Adaptive Transport for Multimedia Networking", Third COST 237 International Workshop on Multimedia Telecommunications and Applications, Barcelona, Nov. 25–27, 1996. The object regulating access to the switch resource here is called NodeServer.

FIG. 1 illustrates how objects interact, with communications links between objects being shown as arrows from source to destination. Shown are connection managers 101, RouteObjects 102, NodeServers 103, QOSMappers 104 and ATM switches 105.

Figure 2:
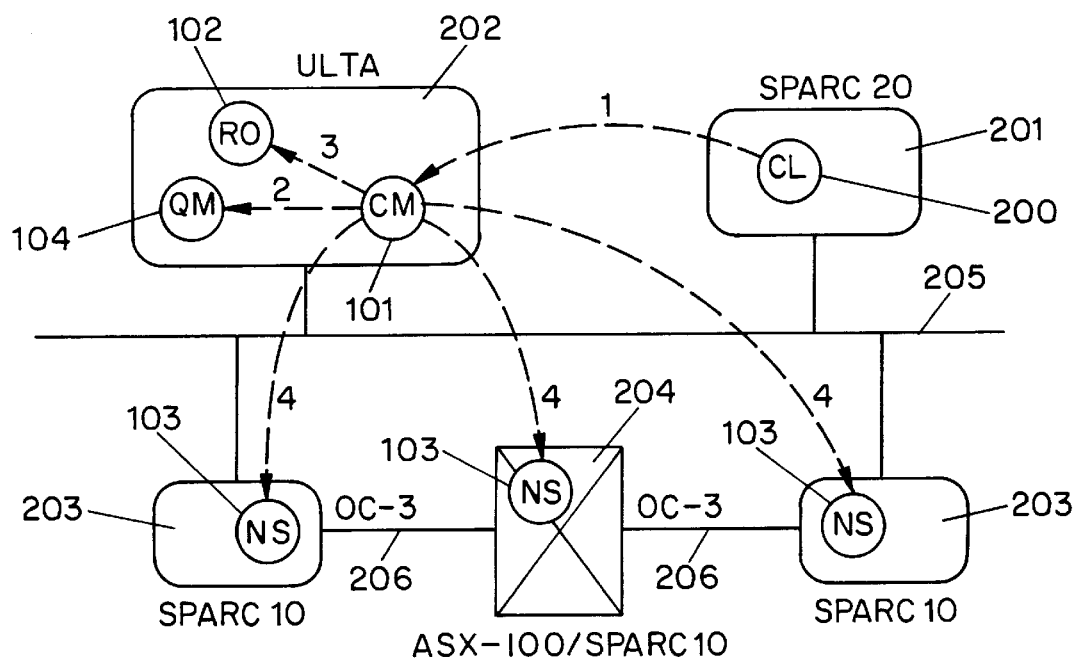
FIG. 2 is a schematic of specific components, and of sequenced execution of a connection set-up request in the system of FIG. 1.

FIG. 2 illustrates how objects shown in FIG. 1 can be implemented. A client's program 200 runs on a Sparc20 work station 201 connected to a local area network (LAN) 205. Further connected to the LAN 205 are: an Ultra work station 202 including the connection manager 101, the RouteObject 102 and the QOSMapper 104; two Sparc10 work stations 203 with NodeServers 103; and an ASX-100 or Sparc10 work station 204 serving as an ATM switch and also including a NodeServer 103. Standard OC-3 optical fiber communication links 206 with a bandwidth of 155 Mbits/sec link the work stations 203 and 204 as shown. The usual order of execution is indicated by numerals 1–4 in sequence, representing a set-up request (Step 1), QOS mapping (Step 2), route selection (Step 3) and resource reservation (Step 4).

An efficient design of the connection manager takes into account that the majority of the remote operations during connection set-up have small arguments, that remote calls contribute most of the latency of call processing, and that most computations are executed in the communication layer. Accordingly, the following features are included in a preferred high-performance management system: parallelization of object call request execution, for processors to be kept busy as much as possible; caching of network states, to minimize the number of remote procedure calls; and aggregation of access to NodeServer objects, by combining multiple requests into a single remote invocation.

A. Parallelization of Object Call Request Execution. Due to the inherent delay incurred in accessing remote objects, the connection processing delay can be decreased by parallel invocations of remote objects. This can be achieved by employing asynchronous object invocations, implemented as one-way calls in CORBA.

Figure 3:
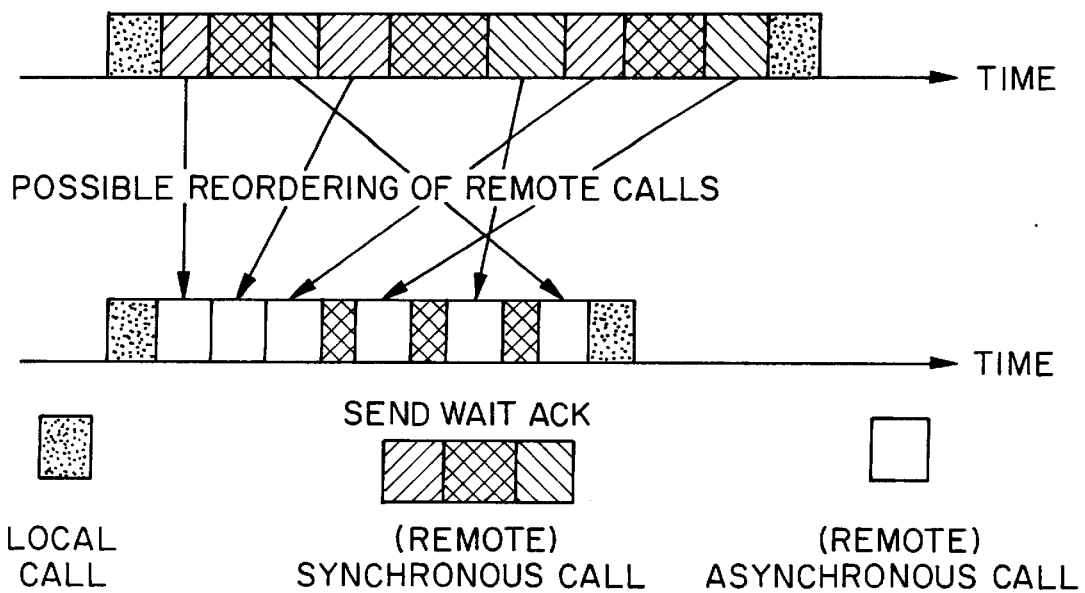
FIG. 3 is a schematic which illustrates timing in object call request execution in the system of FIG. 1.

In the upper time line of FIG. 3, calls are represented as invoked sequentially. Each sequential or synchronous object call has three stages: send, wait and acknowledge. When remote invocations are made sequentially, the total waiting time is the sum of the individual waiting times. But if the send functions are performed first before waiting for the acknowledgments, i.e. if the call executions are parallelized, the waiting time is reduced. This is represented in the lower time line in FIG. 3, where all send messages are performed together, followed by a waiting period, and finally by the reception of the acknowledgments. If the waiting time for receiving acknowledgments is much longer than the execution time of "send", parallel execution has the potential of shortening the total waiting time to the maximum of the individual waiting times. Thus, by parallelizing the execution, the processor can be kept busy for a longer period of time while minimizing the total waiting period, thus minimizing the total latency.

B. Caching of Network States. The throughput of the connection manager can be increased and the latency of call set-up decreased by state caching. Five types of caching can be performed, namely:

(i) placing the QOSMapper in the same address space as the connection manager, (ii) caching the most recent routes requested by the RouteObject, (iii) caching of output or input VCI/VPIs, (iv) caching of bandwidth and buffer resources, and (v) caching of existing connection states.

As shown in FIG. 2, the connection manager performs remote invocations on three classes of objects: QOSMapper, RouteObject and NodeServer. For each of these object classes, part or all of its states are stored or cached in the connection manager.

First, for minimizing the cost of invocations of the QOSMapper: Since the mapping performed by the QOSMapper is relatively static and does not change during the lifetime of the connection manager, the QOSMapper can be placed in the same address space as the connection manager. If this is the case, accessing the QOSMapper from the connection manager becomes a local invocation rather than a remote invocation.

Second, with respect to minimizing the cost of invocations of the RouteObject: During repeated call set-ups, patterns of call requests emerge that have the same source-destination pairs. For calls belonging to these patterns, it is not necessary to have the connection manager invoke the RouteObject each time a set-up request is received. Instead, when the connection manager receives a route for a specific source-destination pair from the RouteObject, it will cache the route (or alternate routes) with a time stamp associated with each. Statistics of route selection for the alternate routes can also be included. By defining a variable time-out period for route invalidation, of T seconds, say, the connection manager can use the "cached" route if it is less than T seconds old. Otherwise, a new route will be requested. If the expected call throughput is 100 calls/sec, and the probability of a source-destination (SD) pair appearing in a call request is 0.01, then, by setting T=10 sec, there will be one update per 10 seconds per SD pair, instead of 100×0.01×10=10 updates in 10 seconds, an improvement by a factor of 10. Updates are performed on demand. Therefore, if a route "times out", there will be no extra update.

Figure 4:
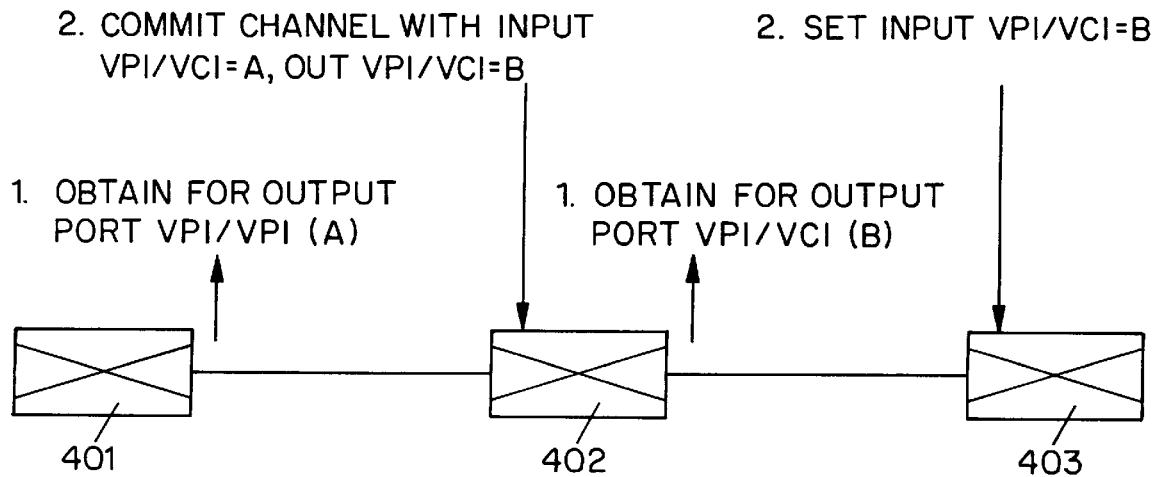
FIG. 4 is a schematic which illustrates the setting up of VCI/VPI tables in an ATM network.

Third, with respect to the cost of invocations of the switch (routing) table, the process of setting up the routing tables in the path of a call is illustrated by FIG. 4. Shown are three ATM switches 401–403 connected in series by communications links. The process requires two phases. In phase one, an output VCI/VPI pair is obtained from the output port of each of the ATM switches located in the path of the call. In the second phase, the output VCI/VPI pair of the upstream switch is mapped into the output VCI/VPI pair of the downstream switch, thereby committing the channel. This two-phase operation also is indicated as Step 4 in FIG. 2. As described, the output VCI/VPI of the appropriate port of each intermediate switch is reserved first, followed by the input VCI/VPI. The reverse, i.e. input followed by output is also feasible.

Thus, if the output (or input) VCI/VPI pairs are known in advance, the entire commit process can be performed in a single phase. When the NodeServers agree on controlling the same set of name spaces, e.g. input VCI/VPI, Step 1 in FIG. 4 can be performed in advance. The connection manager obtains control over a set of available output VCI/VPI pairs that it requests in advance, i.e. reserves from the NodeServers. During connection set-up time, the connection manager simply looks for an available VCI/VPI pair in its name space cache. If an available output VCI/VPI pair is found ("cache hit") for each switch/port on the path of the call, then the channel reservation process can be performed in a single step. In case of a "cache miss", i.e. if no free VCI/VPI pair is available, the normal two-step operation is performed for all switches with cache misses.

By keeping the available VCI/VPI pairs with the connection managers instead of the NodeServers, the VCI/VPI state of an ATM network is partitioned and distributed to the higher-level controllers. This partitioning and distribution process can be dynamically or statically performed in different ways.

In one approach, the number of VCI/VPI pairs reserved per port per switch is competitively decided among the controllers reserving the resources. Thus, each connection manager adjusts the number of entries (VCI/VPI pairs) kept in its cache depending on the call arrival and departure statistics, and how much it is willing to pay for a low latency call set-up. In another approach, the size of partitions is controlled by a distributed algorithm that attempts to optimize the partitioning of the name spaces on the network level. The two approaches differ in that in the first case, the allocation process is performed using the rules of a competitive game, whereas in the second case the partitioning process is performed in a cooperative manner. Combinations of the two approaches are also feasible.

Fourth, caching of bandwidth and buffer resources is similar to VCI/VPI name space caching and is typically performed per output port. This is particularly useful for reserving a minimum amount of bandwidth and buffer space to a particular connection manager. The cooperative and competitive techniques described above also apply to the partitioning of bandwidth and buffer resources.

Fifth, concerning existing connections, when a connection has been set up successfully, its state is kept by the connection manager. Also, this information is replicated in the NodeServers, so that the connection manager can recover its prior state from the NodeServers. By caching such information locally in the connection managers, the state of the existing connections can be accessed using local object invocations. This information is particularly useful during QOS renegotiations.

Table 1 shows an example of the information cache in the connection manager, with only the capacity per port being shown. In Table 1, under "VCIs Reserved", "VCI" stands for "VCI Available". "S" stands for "Source", "D" for "Destination", with further abbreviations being self-explanatory.

tion manager. With reduced load on the NodeServers, additional connection managers can be added to the signaling system, resulting in enhanced throughput with minimal increase in latency.

Figure 5:
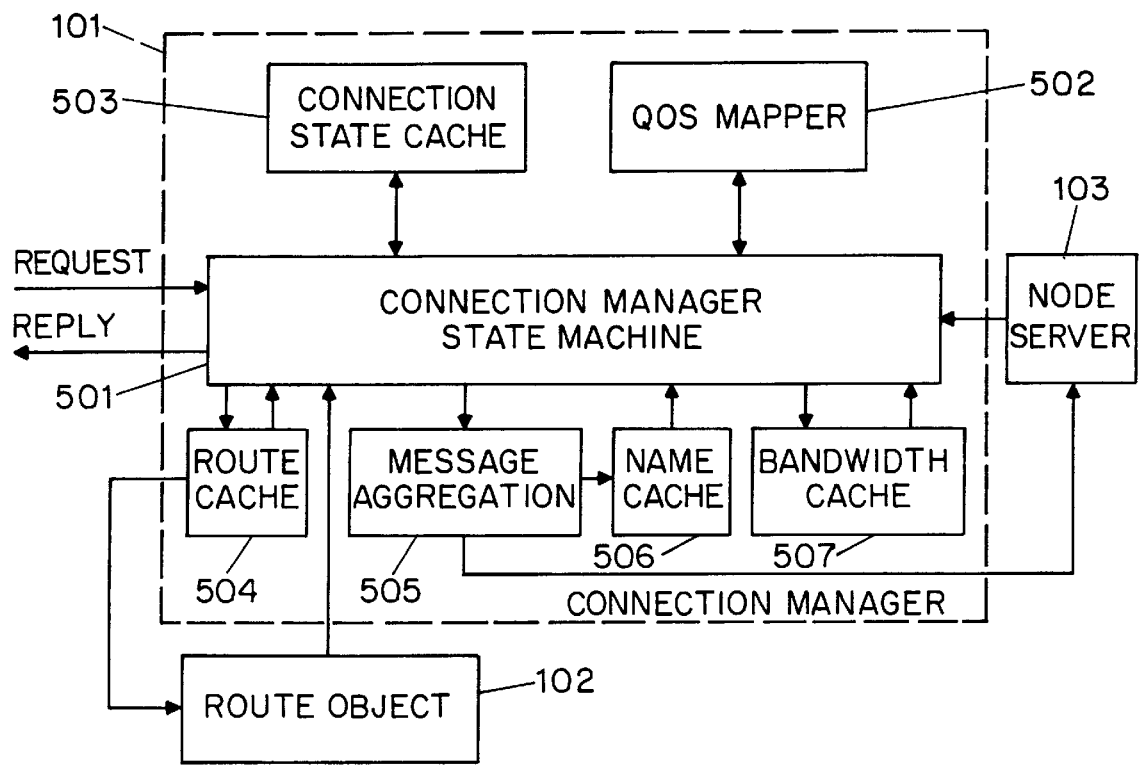
FIG. 5 is a schematic for a preferred connection manager.

D. Functional Design of a Preferred Connection Manager. In the embodiment illustrated by FIG. 5, the connection manager 101 includes a connection manager state machine 501, a QOSMapper 502, a connection state cache 503, a route cache 504, a message aggregation module 505, a name cache 506 and a bandwidth cache 507. A database RouteObject 102 is linked to receive route information from the route cache 504 and to furnish route information to the connection manager state machine 501. A NodeServer 103 is linked to receive message aggregates from the message aggregation module 505 and to serve the connection manager state machine 501.

The connection manager state machine is unaffected by the caching and aggregation schemes. Messages to be sent to the NodeServers are put in queues in the message aggregation module, with one queue per remote object. Messages in these queues are actually transmitted when either the number of messages reaches a threshold which can be dynamically set and changed, or when time-out occurs. Time-outs are used as a safety mechanism to ensure that messages do not remain in the queue for too long without being processed. They are needed when traffic is light. In most cases, in particular when the request rate is high, most of the operations are performed locally. Relatively infrequently, the connection manager makes invocations to remote objects.

Figure 6:
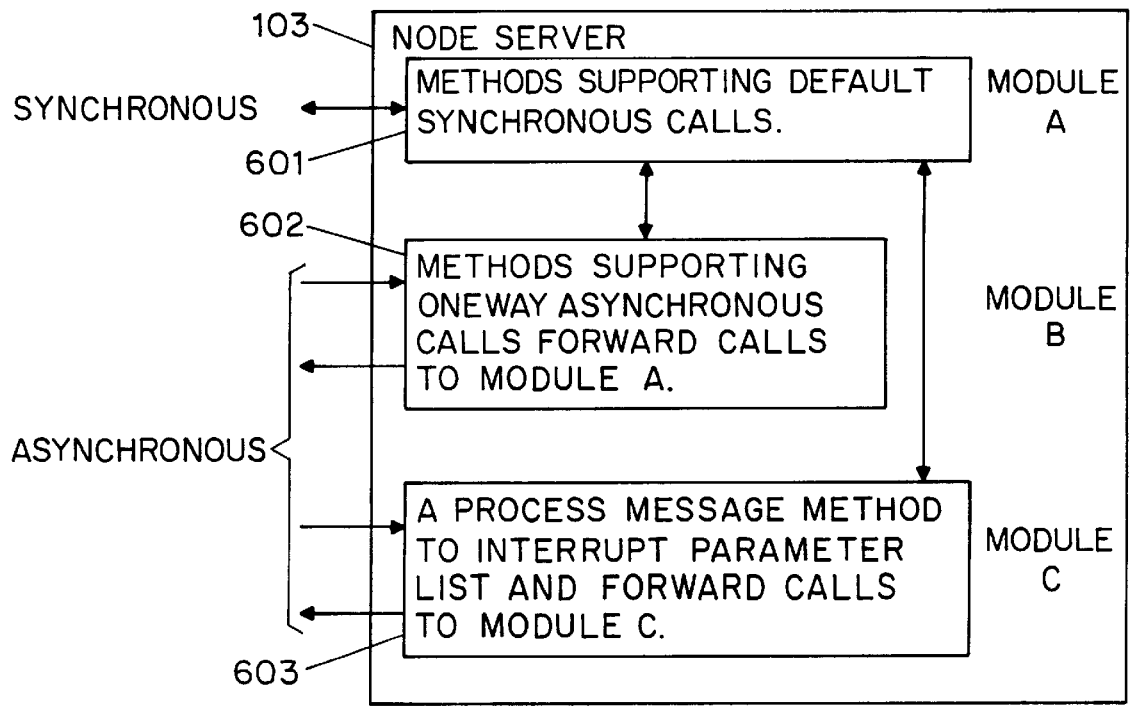
FIG. 6 is a schematic for the interface of the NodeServer object of FIG. 5.

To support different modes of invocation, the NodeServer supports three classes of interfaces as illustrated by FIG. 6. At the lowest level, the set of synchronous remote invocations supported is implemented by a set 601 of functions included in Module A. For each of these synchronous techniques, two asynchronous techniques 602 are defined so that the acknowledgment is separated from the invocation, included in Module B. This serves to support the asynchronous mode of invocation. Finally, a generic, asynchronous technique 603 is included in Module C, taking as argument

TABLE 1

State Caching on a Connection Manager

| | End-to-End Connectivity | Rte. Cached | | VCIs Reserved | | | Bandwidth Reserved | | |
|---|---|---|---|---|---|---|---|---|---|
| ID | Existing Connections | S → D | Route | Nde | Prt | VCI | Nde | Prt | Resource |
| x | state of connection request x | A → B | A → E → B | A | 5 | B1 | A | 5 | C1 |
| y | state of connection request y | A → E | A → E | E | 3 | B2 | C | 1 | C2 |

C. Aggregate Access to the NodeServer Object. In a distributed object environment where the vast majority of object interactions are in simple request-reply form with small arguments (less than 1000, for example), the most expensive operations are remote invocations. To increase the throughput of the system, multiple requests or messages are combined into a single remote invocation instead of making multiple individual invocations, one per request. As a result, in a single invocation, the argument is a list of commands, each command corresponding to a single request. The number of requests stored in the message buffer before these are sent out is used as a control parameter.

This technique is advantageous in that, by delaying the processing of requests, the total number of remote invocations performed by the connection manager decreases. It is especially useful for invocations to the NodeServers, i.e. the class of objects most often communicated to by the conneca list that can be used to represent any of the asynchronous techniques in Module B.

A system as described can be built using "off-the-shelf" hardware and software modules, with no need for specialized equipment.

We claim:

1. An ATM call processing system comprising:
   a connection manager for issuing ATM routing instructions to switch controllers; and
   a quality-of-service mapper operatively coupled to the connection manager for mapping between specifications for different communications service modes;
   wherein the connection manager and the quality-of-service mapper are disposed in a shared address space.

2. The ATM call processing system according to claim 1, wherein one of the specifications comprises user frame specifications and another of the specifications comprises ATM cell specifications.

3. An ATM call processing method comprising obtaining a connection request;

referring to a cache of prior network states; and determining whether one of the prior network states can be used in satisfying the request and, if so, using that network state in satisfying the request.

4. The ATM call processing method according to claim 3, wherein the cache comprises prior routes requested.

5. The ATM call processing method according to claim 3, wherein the cache comprises names.

6. The ATM call processing method according to claim 5, wherein the names are output VCI/VPIs.

7. The ATM call processing method according to claim 5, wherein the names are input VCI/VPIs.

8. The ATM call processing method according to claim 5, wherein the names are VCI/VPIs, and further comprising competitive bidding in reserving a number of VCI/VPI pairs per port per switch.

9. The ATM call processing method according to claim 5, wherein the names are VCI/VPIs, and further comprising distributed optimization processing in reserving a number of VCI/VPI pairs per port per switch.

10. The ATM call processing method according to claim 3, wherein the cache comprises bandwidth and/or buffer information.

11. The ATM call processing method according to claim 10, further comprising competitive bidding in bandwidth and/or buffer allocation.

12. The ATM call processing method according to claim 10, further comprising distributed optimization processing in bandwidth and/or buffer allocation.

13. The ATM call processing method according to claim 3, wherein the cache comprises connection states.

14. An ATM call processing system comprising an input for connection requests;

a cache for prior network states; and a processor instructed for determining whether one of the prior network states can be used in satisfying a current one of the connection requests and, if so, using that network state in satisfying the current request.

15. An ATM processing method comprising:

obtaining connection requests;

caching, from the connection requests, a plurality of connection requests whose processing requires invocation of a common network object; and invoking the common network object for the plurality of connection requests.

16. An ATM processing system comprising:

an input for connection requests;

a selector for selecting from the connection requests a plurality of connection requests whose processing requires invocation of a common network object;

a cache for the selected connection requests; and a processor instructed for processing the cached connection requests.

17. An ATM call processing system comprising:

a connection manager state machine;

a message aggregation module operatively coupled to the connection manager state machine for aggregating messages from the connection manager state machine, and operatively coupled to at least one node server module which is operatively coupled to the connection manager state machine;

a route cache module operatively coupled to the connection manager for receiving route information from the connection manager state machine, and operatively coupled to a route database object which is operatively coupled to the connection manager state machine;

a name cache module operatively coupled to the message aggregation module for receiving VCI/VPI information from the message aggregation module, and operatively coupled to the connection manager state machine; and a bandwidth cache module operatively coupled to the connection manager state machine for bidirectional communication.

* * * * *